United States Patent
Schurz et al.

(10) Patent No.: US 11,161,405 B2
(45) Date of Patent: Nov. 2, 2021

(54) SEALING DEVICE FOR SEALING A THROUGH OPENING IN A VEHICLE CHASSIS AND VEHICLE HAVING SUCH A SEALING DEVICE

(71) Applicant: Daimler AG, Stuttgart (DE)

(72) Inventors: Andreas Schurz, Aichelberg (DE); Tobias Rohse, Schwieberdingen (DE); Julius Friedrich Klinger, Sindelfingen (DE); Andreas Uhrig, Ludwigsburg (DE); Joern Goerlich, Ehningen (DE); Roland Joerg, Rottenburg (DE); Frederik Hanel, Stuttgart/Ost (DE); Wolfgang Much, Effringen (DE)

(73) Assignee: Daimler AG, Stuttgart (DE)

( * ) Notice: Subject to any disclaimer, the term of this patent is extended or adjusted under 35 U.S.C. 154(b) by 36 days.

(21) Appl. No.: 16/641,972

(22) PCT Filed: Jun. 19, 2018

(86) PCT No.: PCT/EP2018/066180
§ 371 (c)(1),
(2) Date: Feb. 25, 2020

(87) PCT Pub. No.: WO2019/042616
PCT Pub. Date: Mar. 7, 2019

(65) Prior Publication Data
US 2020/0223308 A1 Jul. 16, 2020

(30) Foreign Application Priority Data
Aug. 26, 2017 (DE) ..................... 10 2017 008 108.5

(51) Int. Cl.
*B60K 15/05* (2006.01)
*E05F 15/603* (2015.01)
*E05D 15/56* (2006.01)

(52) U.S. Cl.
CPC .............. *B60K 15/05* (2013.01); *E05D 15/56* (2013.01); *E05F 15/603* (2015.01);
(Continued)

(58) Field of Classification Search
CPC .............. B60K 15/05; B60K 2015/053; B60K 2015/0523; B60K 2015/0515;
(Continued)

(56) References Cited

U.S. PATENT DOCUMENTS 5,234,122 A * 8/1993 Cherng .............. B60K 15/0406
220/211
7,261,360 B2 8/2007 Busch et al.
(Continued)

FOREIGN PATENT DOCUMENTS

DE 103 50 466 A1 6/2005
DE 20 2011 050 412 U1 10/2011
(Continued)

OTHER PUBLICATIONS

Machine Translation of DE202011050412, all pages (Year: 2011).*
PCT/EP2018/066180, International Search Report dated Nov. 22, 2018 (Two (2) pages).

*Primary Examiner* — Nicolas A Arnett
(74) *Attorney, Agent, or Firm* — Crowell & Moring LLP

(57) ABSTRACT

A sealing device for sealing a through opening in a vehicle chassis includes a sealing element that can be shifted between an open position, in which the through opening is released, and a closed position, in which the through opening can be closed. The sealing device has an adjusting device which includes a guide housing that can be arranged in a spatially fixed manner on the vehicle chassis, in which guide housing a carrier element is translationally and pivotably guided, where the carrier element has the sealing element. A slide guide is provided, via which the carrier element can be translationally shifted and pivoted in relation to the guide
(Continued)

housing. A traction element is translationally entrainably connected to the carrier element, and simultaneously connected in a rotationally decoupled manner, via a pivot bearing. The traction element is translationally shiftable by the drive.

7 Claims, 2 Drawing Sheets

(52) U.S. Cl.
CPC ............... *B60K 2015/053* (2013.01); *B60K 2015/0515* (2013.01); *B60K 2015/0523* (2013.01); *B60K 2015/0538* (2013.01); *E05Y 2201/716* (2013.01); *E05Y 2201/722* (2013.01); *E05Y 2900/534* (2013.01)

(58) Field of Classification Search
CPC .......... B60K 2015/0538; E05F 15/603; E05D 15/56; E05Y 2201/716; E05Y 2201/722; E05Y 2900/534
See application file for complete search history.

(56) References Cited

U.S. PATENT DOCUMENTS

| | | | | |
|---|---|---|---|---|
| 8,382,187 | B2* | 2/2013 | Guendouz | B60K 15/0406 296/97.22 |
| 8,677,690 | B2* | 3/2014 | Lee | E05B 81/25 49/325 |
| 8,870,241 | B2* | 10/2014 | Lee | E05B 81/34 292/144 |
| 9,656,544 | B2* | 5/2017 | Frommann | B60K 15/05 |
| 9,669,708 | B2* | 6/2017 | Dunger | B60K 15/05 |
| 10,011,170 | B2* | 7/2018 | Horikawa | E05B 47/0012 |
| 10,266,050 | B2* | 4/2019 | Kono | G01F 23/363 |
| 10,723,222 | B2* | 7/2020 | Jeon | B60K 15/0406 |
| 2005/0194810 | A1* | 9/2005 | Beck | B60K 15/05 296/97.22 |
| 2019/0194985 | A1* | 6/2019 | Bai | E05B 83/34 |

FOREIGN PATENT DOCUMENTS

| | | |
|---|---|---|
| DE | 10 2011 090 205 A1 | 7/2013 |
| DE | 20 2014 101 216 U1 | 6/2015 |
| FR | 2 949 394 A1 | 3/2011 |

\* cited by examiner

SEALING DEVICE FOR SEALING A THROUGH OPENING IN A VEHICLE CHASSIS AND VEHICLE HAVING SUCH A SEALING DEVICE

BACKGROUND AND SUMMARY OF THE INVENTION

The invention relates to a sealing device for sealing a through opening in a vehicle chassis and a vehicle having such a sealing device.

A sealing device for sealing a through opening in a vehicle chassis emerges from DE 20 2014 101 216 U1, wherein an inner chamber having a filling or coupling device is accessible via the through opening. The known sealing device has a sealing element, which can be shifted between an open position, in which the through opening is released, and a closed position, in which the through opening is closed by means of the sealing element at least regionally arranged therein. For the shifting between the open position and the closed position, the sealing element is typically mounted pivotably around a stationary axis, wherein it executes a pure pivoting movement around the stationary axis. Thus, when shifting from its open position into its closed position, the sealing element changes its orientation in terms of surface area in the chamber, i.e., in particular the orientation of a normal vector standing at least locally perpendicularly on an outer surface of the sealing element, whereby the sealing element in the open position comparatively requires a lot of construction space. A comparatively large clearance space must also be provided for the pivoting movement itself, the clearance space not being able to be used for any other purpose.

A device for sealing an opening provided in a chassis shell emerges from DE 10 2011 090 205 A1, via which opening a fuel tank filler neck is accessible. The opening can be sealed by means of a fuel tank cap cover, wherein the fuel tank cap cover can be adjusted outwardly into an open position in relation to the chassis shell by means of a drive. In addition, the fuel tank cap cover executes a superimposed translational and rotational movement, which is achieved by means of a slide guide. The fuel tank cap cover is attached to a carrier element provided with a permanent magnet, the carrier element being moveably mounted in a central bore of a guide housing, wherein the guide housing is surrounded by a coil, by means of which a magnetic field for shifting the carrier element in the axial direction of the guide housing can be generated. This kind of drive is relatively cost intensive, in particular also because of its arrangement in the wet area of the vehicle and because of the waterproofing thus needed, and is also relatively susceptible to faults. Furthermore, an exact positioning of the fuel tank cap cover in its end positions is not readily possible without corresponding stops that are crucial with regard to tolerances of position.

A fuel tank cover unit for a motor vehicle emerges from DE 20 2011 050 412 U1, in which a sealing cover sealing a chassis opening can be displaced outwardly into a transition position in relation to the chassis shell by means of a slide guide and can be rotated between the transition position and an open position. A spindle that can be driven by means of an electromotor is provided as the drive for this.

A device for sealing a fuel tank access opening in a motor vehicle shell emerges from genetic DE 103 50 466 A1.

The object of the invention is to create a sealing device for sealing a through opening in a vehicle chassis, the device enabling a compact construction that saves space and can be produced cost-effectively and in an operationally reliable manner. A further object is to create a vehicle having such a sealing device.

The sealing device comprises a sealing element for sealing a through opening in a vehicle chassis, the sealing element being able to be shifted into several functional positions, in particular between an open position releasing the through opening and a closed position covering or sealing the through opening, by means of a drive and an adjusting device, wherein the sealing element in the closed position is arranged at least regionally in the through opening. The sealing device is thus set up to shift the sealing element into the inner chamber of the vehicle chassis, i.e., into a position behind the chassis shell, from the closed position into the open position and back with a combination of a translational movement and a pivoting movement, whereby a reduced need for construction space for the shifting itself and for the arrangement of the sealing element in the open position emerges.

The sealing device is characterized in that the adjusting device comprises a guide housing that can be arranged in a spatially fixed manner on a vehicle chassis, in which guide housing a carrier element is guided translationally and pivotably, wherein the carrier element has the sealing element. Furthermore, a slide guide is provided, by means of which the carrier element can be translationally shifted and pivoted in relation to the guide housing. Furthermore, a traction element translationally entrainably connected via at least one pivot bearing to the carrier element and simultaneously in a rotationally decoupled manner is provided, the traction element being able to be translationally shifted by means of the drive. The drive thus does not directly act on the sealing element or the carrier element, but indirectly via the traction element. In doing so, a certain or corresponding decoupling between traction element and carrier element is possible. Traction forces can be introduced into the carrier element via the driven, in particularly motorically driven, traction element, such that a translational movement can be imparted to the carrier element via the traction element. This enables an overall narrow design of the sealing device, since the drive can be arranged in the shifting direction of the carrier element. Because of the pivot bearing provided, the carrier element is rotationally decoupled from the traction element. This enables a pivot movement of the carrier element without the traction element having to be pivoted. Instead, the traction element can be exclusively translationally shifted, wherein the carrier element can simultaneously be translationally shifted and pivoted, in particular by means of the slide guide.

The pivot bearing is preferably formed as a ball bearing, as a slide bearing, as a roll bearing or in another suitable manner.

The sealing element is particularly entrainably fixed on the carrier element, wherein it cannot be shifted, in particular in relation to the carrier element, i.e., it is held in a spatially fixed manner in a coordinate system moved together with the carrier element. Accordingly, the guide housing is stationarily arranged on the vehicle chassis, such that a relative shifting of the sealing element relative to the vehicle chassis emerges when the carrier element is shifted relative the guide housing. In principle, it is also possible that the sealing element and the carrier element are formed as a single component or integrally with each other.

In particular, because of this design of the adjusting device, a different pivoting axis can be used than with a pure pivoting movement, wherein the latter, in particular, does not permit any pivoting around a pivot axis, which stands transversely or at least substantially perpendicularly on the vehicle chassis in the region of the through opening. With such a pivoting, the sealing element arranged in the closed position at least regionally in the through opening would namely be blocked, since is abuts on the edges of the through opening. However, if it shifts out of the through opening as a result of the translational movement, it can then also be pivoted around an axis, which stand substantially perpendicularly on the vehicle chassis in the region of the through opening, wherein it can preferably be pivoted in parallel behind a wall of the vehicle chassis. The shifting of the sealing element from the open position into the closed position—and back—thus only requires a very small construction space, wherein the sealing element can also be arranged in the closed position behind and in parallel to the wall of the vehicle chassis in a construction space saving manner.

A filling or coupling device is to be understood, in particular, as a device which allows at least one substance or a substance mixture and/or energy, be that in the form of chemical energy, in the form of electrical energy, to be supplied inductively, for example, or in a different manner, to a vehicle, in particular via a galvanic connection or a galvanically separated interface. In particular, the filling or coupling device can be a tank filler nozzle, in particular for fuel or an additive or excipient, a charging socket for suppling electrical energy, in particular a plug socket, a port for inductive charging, or similar. Accordingly, the sealing element is formed, in particular, as a tank cover or charging coupling cover.

The fact that the through opening in the closed position is closed by means of the sealing element means, in particular, that it is covered from the outside of the vehicle chassis by means of the sealing element, i.e., is inaccessible from the outside of the vehicle because of the arrangement of the sealing element in the closed position. In contrast, in the open position, the through opening is accessible, such that the filling or coupling device is used as intended and at least one substance or substance mixture and/or energy can be supplied to the vehicle, in particular from the outside, through the through opening.

A combination of a translational movement and a pivoting movement is understood, in particular, to mean that the sealing element carries out a translational movement along its shifting path from the closed position into the open position—and back—at least sectionally and—in the same or other sections—carries out a pivoting movement at least sectionally. Here, it is possible that the translational movement and the pivoting movement are decoupled from each other in the sense that, in different sections of the shifting path, on one hand, a translational movement takes place and, on the other hand, a pivoting movement takes place, wherein, for example, the sealing element is firstly moved out of the closed position with a translational movement, in particular is withdrawn into the inner chamber, wherein it is then pivoted into the open position by means of a pure pivoting movement. Yet a combination of a translational movement and a pivoting movement is also to be understood as a superposition of a translational movement and a pivoting movement, wherein the sealing element describes a movement path at least sectionally along its shifting path between the closed position and the open position, the movement path resulting from a linear combination, i.e., a superposition, of a translational movement component and a pivoting movement component. Here, it is possible that sections having a pure translational movement and/or a pure pivoting movement additionally exist along the shifting path, yet it is also possible that the sealing element follows along its entire shifting path of a movement path, which results from a superposition of a translational movement component with a rotary movement component.

The translational movement is preferably aligned inwardly into the inner chamber starting from the closed position of the sealing element in the through opening, wherein a translation direction or translation axis of the translational movement preferably locally stands perpendicularly on an outer surface of the sealing element and thus also the vehicle chassis. If the sealing device is laterally attached to a vehicle, the translation axis preferably points at least substantially in the Y-direction, i.e., in the width direction of the vehicle, with the usual choice of the coordinate system for the vehicle.

The pivoting movement preferably takes place around a pivoting axis, which is aligned at least substantially in parallel, preferably in parallel to the translation axis. Particularly preferably, the pivoting movement takes place around the translation axis. In particular, the pivoting movement preferably takes place around an axis running in the transverse direction (y-direction) of the vehicle. In this way, the sealing element can, on one hand, be drawn inwards, i.e., into a position shifted back in relation to the chassis outer surface, and, on the other hand, can be pivoted behind the chassis wall.

According to a development of the invention, it is provided that the outer surface of the sealing element in the closed position is arranged flush with a chassis outer surface of the vehicle chassis, the chassis outer surface surrounding the through opening. Thus, a particularly optically attractive, flush-mount arrangement of the sealing element in the closed position with the vehicle chassis and, in particular the vehicle shell, emerges, such that no optical protrusions or recesses emerge in the region of the sealing device.

In the open position, the sealing element is preferably shifted so far into the inner chamber of the vehicle chassis that it is no longer visible from the outside, in particular with a perpendicular viewing direction of the through opening. The vehicle then also has a particularly attractive impression in the open position.

According to a development of the invention, it is provided that the drive allocated to the sealing element for its shifting between the closed position and the open position and back is formed as a motoric drive, particular preferably as an electromotive drive. For the user of the sealing device, this constitutes a particular comfortable design because they do not then have to manually actuate the sealing element.

It is possible that the drive can be activated by actuating a button. However, particularly preferably, the drive is connected to a control device which is set up to automatically control the drive, in particular in an event-driven manner. Particularly preferably, a proximity sensor is arranged on the sealing device, the proximity sensor recognizing when the hand of a user, for example, or a supply means for suppling energy or a substance or substance mixture approaches the sealing element, wherein the proximity sensor, in this case, emits a signal, based on which the drive is controlled for shifting the sealing element from its closed position into its open position. In reverse, the drive can be controlled to shift the sealing element from its open position into its closed position when the proximity sensor recognizes that the supply device and/or the hand of the user shifts away again from the sealing device.

Yet according to an alternative embodiment, the drive can also comprise a simple cable pull, a leverage or similar, thus can be formed purely mechanically, wherein it can be actuated by hand by a user of the vehicle, for example from a driving position.

Yet of course it is also possible that the sealing element can be shifted manually, in particular by directly engaging with the sealing element itself, from its open position into the closed position—and back.

According to a preferred embodiment of the sealing device, it is provided that the filing or coupling device— preferably at the same time as the shifting of the sealing element between the closed position and the open position— can be shifted, wherein the filling or coupling device can be shifted, in particular for coupling or filling from a rest position in the direction of the outside of the vehicle chassis, in particular in the transverse direction of the vehicle, into a work position in order to simplify the filling and/or coupling. Before or during the shifting of the sealing element from the open position into the closed position, the filling or coupling device can then be shifted back into its rest position, in particular in the inner chamber, preferably in turn in the transverse direction of the vehicle. It is possible that a separate drive, in particular a separate motoric drive, is provided for shifting the filling or coupling device. Yet it is also possible that the filling or coupling device can be shifted by the same drive which is also allocated to the sealing element for its shifting.

The carrier element is shifted translationally, in particular along a translation axis, and pivotably around a pivoting axis. Preferably, the pivoting axis coincides with the translation axis or is aligned at least substantially in parallel, preferably in parallel to the translation axis.

Preferably, the adjusting device has an adjusting mechanism for adjusting a filling or coupling device, such that this can be shifted between a working position and a rest position by means of the adjusting mechanism.

According to a development of the invention, it is provided that the guide housing for the carrier element is formed to be tubular. This enables a particular simple and stable reception and guide of the carrier element in the guide housing. In particular, the guide housing can be formed as a guide tube.

According to a development of the invention, it is provided that the slide guide, by means of which the carrier element is translationally shiftably and pivotably coupled in relation to the guide housing, in particular is designed to guide the carrier element in the guide housing along a predetermined movement path, preferably has a first part, selected from the guide housing and the carrier element, at least one guide spin or guide pen or similar, wherein a second part different to the first part, selected from the carrier element and the guide housing, has at least one guide recess. The at least one guide pen engages into the at least one guide recess, and the guide recess is formed to at least sectionally couple a translational relative movement between the carrier element and the guide housing to a pivot movement of the carrier element. This means, in particular, that the guide recess via the guide pen engaging into the guide recess because of its spatial-geometric design and because of the coupling of the guide housing to the carrier element, causes a translational shifting of the carrier element relative to the guide housing to be at least sectionally superimposed by a pivoting movement of the carrier element, or that, in contrast to a pivoting movement of the carrier element, a translational relative movement is superimposed.

The at least one guide recess is preferably formed to be at least sectionally coiled, in particular wound similar to a spiral or helical spring, wherein it preferably winds around the translation axis of the translation movement of the carrier element. It is possible that the guide recess is formed to be wound along its entire extension. Yet it is also possible that it is at least sectionally formed as a straight line. In particular, it is possible that the guide recess in a starting region, beginning at a location of the guide recess, on which the guide pin in the closed position is arranged, is formed to be a straight line across a predetermined extension in the direction of the open position before it transfers into a wound course. In this way, initially a translational movement of the sealing element out of the closed position can be caused, wherein a superimposition from a translational movement and a pivoting movement follows on from this.

According to a preferred embodiment, the guide recess is formed as a guide groove. Alternatively, it is possible that the guide recess can also be formed by a slot.

Preferably, the at least one guide pen is arranged on the guide housing, wherein the at least one guide recess is arranged on the carrier element. Yet an opposite design is also possible.

Preferably, the slide guide has a plurality of guide pens and a plurality of guide recesses, wherein preferably one guide recess is allocated to every guide pen and one guide pen to every guide recess. The guide pens and/or guide recesses are preferably arranged symmetrically, in particular at the same angle distances in relation to one another, when seen along a peripheral direction, which extends concentrically around the translation axis and/or the pivot axis. Particularly preferably, the slide guide has four guide pens and four guide recesses.

According to a development of the invention, it is provided that the traction element is formed as a gear rack. This constitutes a particularly simple design of the traction element that is easy to drive. Other than a longitudinal section having teeth, the gear rack also has another coupling section, in the region of which the gear rack/the traction element is coupled to the carrier element.

The traction element preferably interacts with a gear tooth, which is driven by a motor, in particular by an electromotor. In this way, a rotational movement of the motor can be converted into a translation movement of the traction element. The motor is preferably motorically operatively connected to the gear tooth via a transmission. The transmission is preferably formed to be self-locking. In this case, a shifting of the sealing element is only possible by activating the motor, since the self-locking of the transmission prevents a shifting of the sealing element when forces are introduced into the sealing element without the motor being operated.

According to a development of the invention, it is provided that the sealing device has an adjusting device according to one of the exemplary embodiments described above. In particular, an adjusting device according to one of the exemplary embodiments described above is allocated to the sealing element for its shifting between the closed position and the open position and back. Here, the sealing element is arranged entrainably on the carrier element.

Finally, the object is also solved by a vehicle being created which has a sealing device according to one of the exemplary embodiments described above. Here, in particular in the context of the vehicle, the advantages that have already been described in conjunction with the sealing device emerge.

The sealing element of the vehicle is formed, in particular, as a fuel tank or charging coupling cover.

The invention is explained in more detail below by means of the drawings.

DETAILED DESCRIPTION OF THE DRAWINGS

Figure 1:
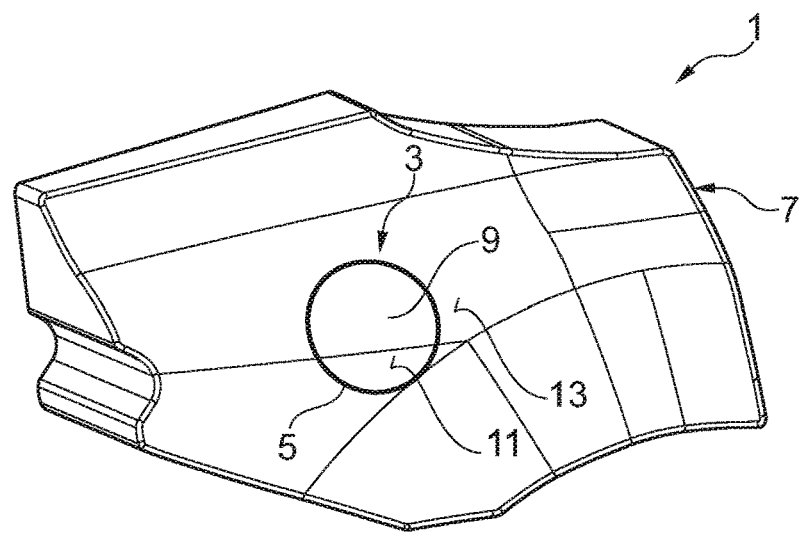
FIG. 1 is a detailed depiction of an exemplary embodiment of a vehicle having an exemplary embodiment of a sealing device.

FIG. 1 shows a schematic detailed depiction of an exemplary embodiment of a vehicle 1 having an exemplary embodiment of a sealing device 3, which serves to seal a through opening 5 in a vehicle chassis 7 of the vehicle 1. An inner chamber covered in FIG. 1 is accessible via the through opening 5 from the outside of the vehicle, in which inner chamber a filling or coupling device, in particular for supplying at least one substance or substance mixture and/or of energy into the vehicle 1, is arranged.

The sealing device 3 has a sealing element 9, which can be shifted between an open position, in which the through opening 5 is released, and a closed position depicted in FIG. 1, in which the through opening 5 is closed by the sealing element 9. The sealing element 9 is arranged in the closed position at least regionally in the through opening 5, wherein, in the exemplary embodiment depicted here in the Figures, it has an outer surface 11, in particular, which is arranged flush, in particular flush-mount, preferably aligning, with a chassis outer surface 13 of the vehicle chassis 7 immediately surrounding the through opening 5 and abutting on the through opening 5. The sealing element 9 is a flat component, in particular similar to a board or a flap, that is formed in such a way that, in its closed position, it is usually inserted into the chassis shell as though, optically, the chassis shell has not been broken.

Figure 2:
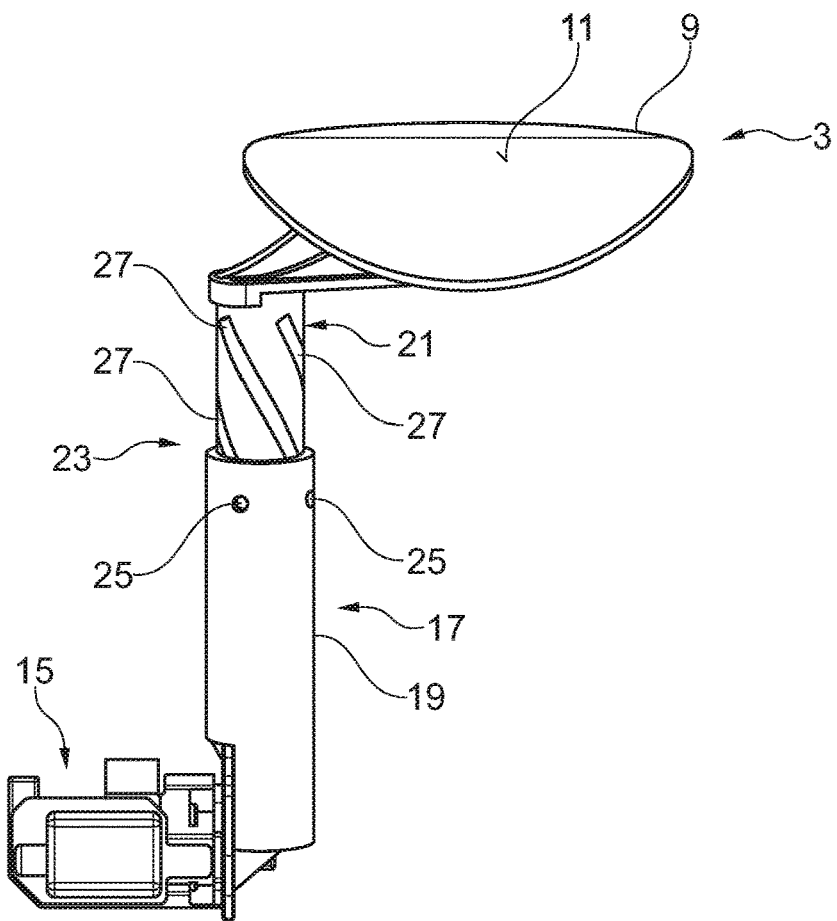
FIG. 2 is a detailed depiction of the exemplary embodiment of the sealing device according to FIG. 1 having an exemplary embodiment of an adjustment device for shifting the sealing element.

FIG. 2 shows a detailed depiction of the sealing device 3 according to FIG. 1, The same and functionally same elements are provided with the same reference number, such that, in this respect, reference is made to the preceding description. The sealing device 3 is set up, i.e., designed, so that, in the state installed in the vehicle, it can shift the sealing element 9 from the closed position into the open position—and preferably back—with a combination of a translational movement and a pivot movement into the inner chamber of the vehicle chassis 7. With the adjustment according to use of the sealing element 9, a superimposition of translational and rotational movements thus takes place at least across a partial stretch of the adjustment path. In principle, it is also possible that the sealing element 9 carries out a pure linear movement along a straight line or axis via a partial stretch of its adjustment path. This kind of a stroke movement can serve to introduce the sealing element into the through opening or to move it out of this without the sealing element here knocking against adjacent chassis regions abutting on the through opening or adjacent to this, in particular chassis shell regions.

In this way, it is possible, in particular, to design the shifting of the sealing element 9 itself in a manner that saves a lot of space and to simultaneously also reduce the constructive space in the open position of the sealing element 9. This can be extended into the inner chamber, in particular starting from the closed position depicted in FIG. 1, and thus pivoted behind the vehicle chassis 7, such that, in the open position—as in the closed position—it is arranged substantially in parallel to the vehicle chassis 7 and in particular to the chassis shell 13, whereby it also requires less constructive space in the open position. In doing so, the sealing element 9 is arranged in the inner chamber to be protected from outside influences, for example an unwanted manual manipulation by a third person.

A drive 15, in particular a motoric drive 15, is allocated to the sealing element 9 for shifting between the closed position and the open position. The drive 15 is preferably formed as an electromotor.

The sealing device 3 has an adjusting device 17, which is set up for shifting the sealing element 9 between the open position and the closed position. The adjustment device 17 has a guide housing 19 that can be arranged in a spatially fixed manner on the vehicle chassis 7, preferably that is arranged in a spatially fixed manner on the vehicle chassis 7, wherein, in the guide housing 19, a carrier element 21 is guided translationally, i.e., along a straight line, and pivotably. In particular, the carrier element 21 is guided translationally shiftably in the direction of a longitudinal axis of the guide housing 19 and pivotably around the longitudinal axis of the guide housing 19 in the guide housing 19.

The sealing element 9 is fixed to the carrier element 21. In particular, here the sealing element 9 is fixed entrainably on the carrier element 21 and in a spatially fixed manner on the carrier element 21 in the reference system of it. It is advantageous in the separate formation of the carrier element and sealing element, among other things, that, if the sealing element is to be varnished in the vehicle color, this can take place before the sealing element is connected to the carrier element.

The guide housing 19 is formed to be tubular, wherein the carrier element 21 is mounted inside the tubular guide housing 19 in such a way that it can be moved relatively in relation to the guide housing 19, which will be explained in more detail below.

The adjusting device 17 has a slide guide 23, via which or with the aid of which the carrier element 21 is coupled to the guide housing 19 in such a way that the carrier element 21 can here be translationally shifted relative to the guide housing 19 that is stationarily fixed on the vehicle chassis and can be pivoted. Here, in the exemplary embodiment depicted, the guide housing 19 has at least one guide pen, here a plurality of guide pens 25, in particular four guide pens 25, wherein the cylindrical, rod-shaped or tubular carrier element 21 has at least one guide recess, here a plurality of guide recesses 27, in particular four guide recesses 27, on its outside, i.e., on its lateral surface. The guide pens 25 engage into the guide recesses 27. Alternatively, it is possible that the guide housing 19 has at least one guide recess 27, wherein the carrier element 21 has at least one guide pen 25. It is also possible that the guide housing 19 has both at least one guide pen 25 and at least one guide recess 27, wherein the carrier element 21 also has at least one guide recess 27 and at least one guide pen 25.

Here, the guide recesses 27 are formed, in particular, as guide grooves. In principle, it is also possible that a respective guide recess 27 is formed by a slot, wherein, to do so, the guide pen to be brought into engagement with the slot would be dimensioned correspondingly.

The guide recesses 27 are formed to at least sectionally couple a translational relative movement between the carrier element 21 and the guide housing 19 to a pivoting movement of the carrier element 21, i.e., to superimpose. To do so, the guide recesses 27 are designed to be coiled, in particular at least sectionally, in particular wound along screw lines around the longitudinal axis of the carrier element 21, which is simultaneously also the longitudinal axis of the guide housing 19. It is possible that the guide recesses 27 are formed to be coiled along their entire extension. Yet it is also possible that they are formed sectionally, in particular in a starting section, in which the carrier element 21 is arranged in the closed position of the sealing element 9, to be straight lines. In this case, firstly, a purely translational shifting of the carrier element 21 out of the closed position in the direction of the open position can take place before this movement transition into a superimposition from a translation movement and a pivoting movement. In this way, the sealing element 9 is thus moved out of the through opening provided on the chassis side firstly in a perpendicular direction before it is moved into the inner chamber that is reserved for it transversely to the through opening behind the outer wall of the chassis.

In any case, sectionally, because of their spatial-geometric design and, in particular, because of their coiling, the guide recesses 27 cause a pivoting movement around this longitudinal axis to be superimposed by a translational shifting of the carrier element 21 in the direction of the longitudinal axis of the guide housing 19, thus in the vertical direction, in particular, in FIG. 2.

It should be noted that the slide guide 23 is formed from the at least one guide recess 27, in particular guide groove, which forms the so-called slide, and the guide pen 25 engaging with this or engaging into the guide recess 27, which effectively forms the so-called guide stone or has its function. The guide pen 25 preferably engages with only a little clearance into the guide recess 27, i.e., the outer diameter or the thickness of the guide pen 25 is smaller than the width of the guide recess 27.

With the exemplary embodiment of the sealing device 3 described by means of FIG. 2, the guide pens 25 are introduced into through openings, in particular bores or threaded bores in the outside of the guide housing 19, in particular screwed in. These through openings penetrate the outer wall of the guide housing 19, such that the guide pens can engage through it and can engage into the respective guide recess.

Figure 3:
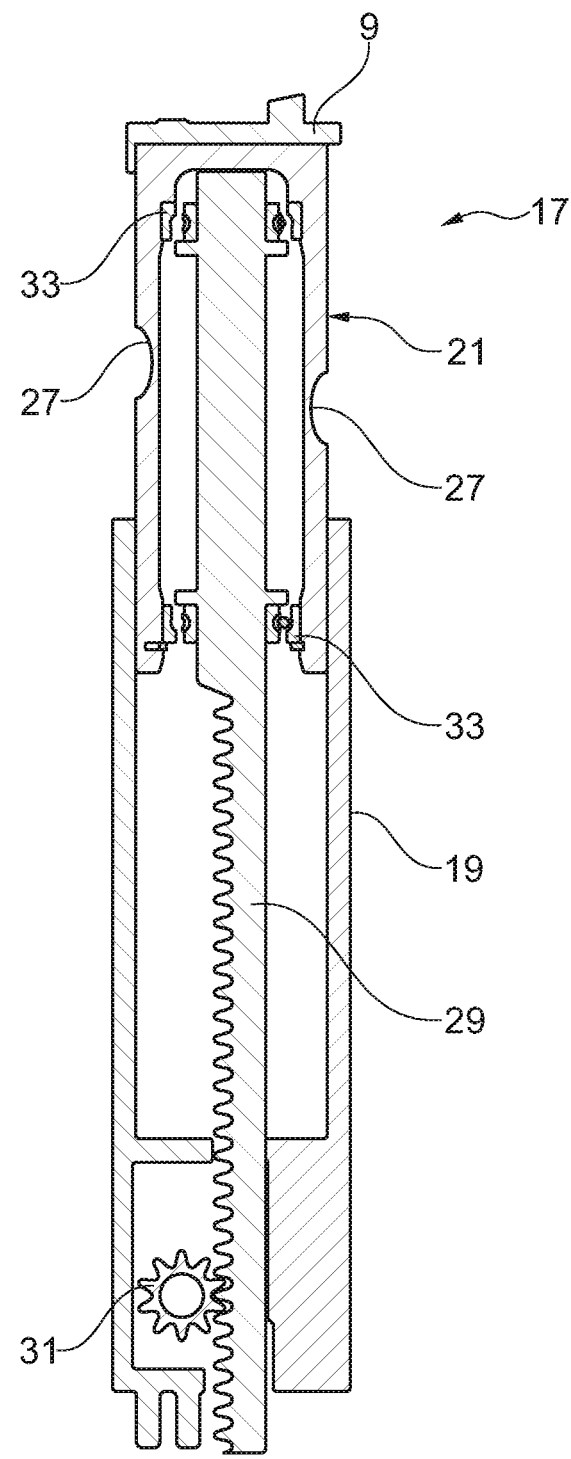
FIG. 3 is a schematic detailed sectional depiction of the adjustment device according to FIG. 2.

FIG. 3 shows a detailed longitudinal sectional depiction of the adjustment device 17 according to FIG. 2. The same and functionally same elements are provided with the same reference numerals, such that, in this respect, reference is made to the description above. The carrier element 21 is entrainably connected to a traction element 29 and can be translationally shifted together with the or by the traction element 29, such that the carrier element 21 is translationally shifted in the axial direction, i.e., here in the longitudinal direction of the guide housing 19, which is simultaneously the longitudinal central axis of the carrier element 21, when the traction element 29 is translationally shifted in this direction. Traction and pressure forces, which point in the axial direction, can be introduced into the carrier element 21 via the traction element 29.

Here, the traction element 29 is formed as a gear rack. It is coupled to a gear tooth 31, which, for its part, is motorically operatively connected to the drive 15. A rotational movement of the drive 15 can thus be transformed via the gear tooth 31 into a translational movement, i.e., a pure linear movement of the traction element 29. In other words, the traction element 29 is finally only shifted linearly along a straight line predetermined by the guide housing 19, wherein the respective shifting direction can be set by the rotational direction of the gear tooth 31.

Preferably, the gear tooth 31 is connected to the drive 15 via a particular self-locking transmission, such that forces from the outside acting on the sealing element 9, in particular, cannot lead to its shifting because such a shifting is blocked by the self-locking transmission.

The carrier element 21 has a cavity, which is open at least on one side and in which the traction element 29 engages or protrudes. In this cavity or receiving chamber, the traction element 29 is connected via at least one pivot bearing, here via two pivot bearings 33, translationally entrainably and simultaneously rotationally decoupled from the carrier element 21 in such a way that, in particular in the event of a shifting movement of the traction element 29, this supplies the carrier element 21 with a force via at least one of the pivot bearings 33, whereby the carrier element 21 is also shifted relatively in relation to the guide housing 19. Because of the slide guide 23 and its coiled or helically running guide recesses 27, the carrier element 21 is here also pivoted around the translation axis of the traction element 29; a superimposition of the translation and rotation or pivoting movement of the carrier element 21 thus takes place. In contrast, the traction element 29 is moved exclusively linearly. Thus, no pivoting movement of the traction element relatively takes place in relation to the carrier element 21.

The sealing element 9 is formed, in particular, as a tank nozzle cover or charging port cover of the vehicle 1.

With the sealing device 3 proposed here, the adjusting device 17 and the vehicle 1, a cinematic system that is particularly space efficient for a sealing element 9 of a vehicle 1 formed, in particular, as a tank nozzle or charging port cover can be provided.

It should be noted that the sealing device 3 can be formed or is formed as a component that can be completely pre-assembled and can be attached to the vehicle as a whole, preferably in an assembly step.

The invention claimed is:

1. A sealing device for sealing a through opening in a vehicle chassis, wherein an inner chamber having a filling or coupling device is accessible via the through opening, comprising:
   a sealing element;
   an adjusting device, wherein the sealing element is shiftable by the adjusting device;
   a drive, wherein the sealing element is shiftable between an open position, in which the through opening is released, and a closed position, in which the through opening is closed by the sealing element, by the drive, wherein the sealing element in the closed position is arranged at least regionally in the through opening;
   wherein the adjusting device includes a guide housing that is arrangeable in a spatially fixed manner on the vehicle chassis, wherein a carrier element is translationally and pivotably guided in the guide housing, and wherein the carrier element is fixed to the sealing element;
   a slide guide, wherein via the slide guide the carrier element is translationally shiftable and pivotable in relation to the guide housing; and
   a traction element that is translationally entrainably connected to the drive for pure linear movement in a rotationally decoupled manner within the guide housing and, via a pivot bearing, to the carrier element so that the pure linear movement of the traction element produces rotation of the carrier element.

2. The sealing device according to claim 1, wherein the sealing element has an outer surface which is arranged in the closed position to be flush with a chassis outer surface of the vehicle chassis and wherein the chassis outer surface surrounds the through opening.

3. The sealing device according to claim 1, wherein the drive is a motoric drive.

4. The sealing device according to claim 1, wherein the guide housing is tubular.

5. The sealing device according to claim 1, wherein the slide guide has a guide pen and a guide recess, wherein the guide pen engages into the guide recess, and wherein the guide recess at least sectionally couples a translational relative movement between the carrier element and the guide housing to a pivoting movement of the carrier element.

6. The sealing device according to claim 1, wherein the traction element is a gear rack.

7. A vehicle comprising the sealing device according to claim 1, wherein the sealing element is a fuel tank cover or a charging port cover.

\* \* \* \* \*